United States Patent
Harmer et al.

(10) Patent No.: US 11,580,378 B2
(45) Date of Patent: Feb. 14, 2023

(54) REINFORCEMENT LEARNING FOR CONCURRENT ACTIONS

(71) Applicant: Electronic Arts Inc., Redwood City, CA (US)

(72) Inventors: Jack Harmer, Stockholm (SE); Linus Gisslén, Solna (SE); Magnus Nordin, Stockholm (SE); Jorge del Val Santos, Stockholm (SE)

(73) Assignee: ELECTRONIC ARTS INC., Redwood City, CA (US)

( * ) Notice: Subject to any disclaimer, the term of this patent is extended or adjusted under 35 U.S.C. 154(b) by 568 days.

(21) Appl. No.: 16/188,123

(22) Filed: Nov. 12, 2018

(65) Prior Publication Data
US 2019/0286979 A1 Sep. 19, 2019

Related U.S. Application Data

(60) Provisional application No. 62/642,863, filed on Mar. 14, 2018.

(51) Int. Cl.
*G06N 3/08* (2006.01)
*G06N 20/00* (2019.01)
*G06N 7/00* (2006.01)

(52) U.S. Cl.
CPC .............. *G06N 3/08* (2013.01); *G06N 7/005* (2013.01); *G06N 20/00* (2019.01)

(58) Field of Classification Search
CPC .......... G06N 3/08; G06N 20/00; G06N 7/005; G06N 20/10; G06N 3/006; G06N 3/0481; G06N 3/0445; G06N 3/084; G06N 3/0454
See application file for complete search history.

(56) References Cited

U.S. PATENT DOCUMENTS

2018/0032863 A1* 2/2018 Graepel ................. G06N 5/003

OTHER PUBLICATIONS

Arulkumaran, Kai, et al. "Deep reinforcement learning: A brief survey." IEEE Signal Processing Magazine 34.6 (2017): 26-38. https://ieeexplore.ieee.org/stamp/stamp.jsp?tp=&arnumber=8103164&tag=1 (Year: 2017).*

(Continued)

*Primary Examiner* — Kakali Chaki
*Assistant Examiner* — Michael H Hoang
(74) *Attorney, Agent, or Firm* — Middleton Reutlinger (57) ABSTRACT

A computer-implemented method comprises instantiating a policy function approximator. The policy function approximator is configured to calculate a plurality of estimated action probabilities in dependence on a given state of the environment. Each of the plurality of estimated action probabilities corresponds to a respective one of a plurality of discrete actions performable by the reinforcement learning agent within the environment. An initial plurality of estimated action probabilities in dependence on a first state of the environment are calculated. Two or more of the plurality of discrete actions are concurrently performed within the environment when the environment is in the first state. In response to the concurrent performance, a reward value is received. In response to the received reward value being greater than a baseline reward value, the policy function approximator is updated, such that it is configured to calculate an updated plurality of estimated action probabilities.

20 Claims, 8 Drawing Sheets

(56) References Cited

OTHER PUBLICATIONS

Pandey, Punit, Deepshikha Pandey, and Shishir Kumar. "Reinforcement learning by comparing immediate reward." arXiv preprint arXiv:1009.2566 (2010). https://arxiv.org/ftp/arxiv/papers/1009/1009.2566.pdf (Year: 2010).*
Silver, David, Richard S. Sutton, and Martin Müller. "Reinforcement Learning of Local Shape in the Game of Go." IJCAI. vol. 7. 2007. https://www.aaai.org/Papers/IJCAI/2007/IJCAI07-170.pdf (Year: 2007).*
Dedieu, Antoine, and Jonathan Amar. "Deep reinforcement learning for 2048." Conference on Neural Information Processing Systems (NIPS), 31st, Long Beach, CA, USA. 2017. https://stuff.mit.edu/people/adedieu/pdf/2048.pdf (Year: 2017).*
Adil, Khan, et al. "Training an agent for fps doom game using visual reinforcement learning and vizdoom." International Journal of Advanced Computer Science and Applications 8.12 (2017). https://thesai.org/Publications/ViewPaper?Volume=8&Issue=12&Code=IJACSA&SerialNo=5 (Year: 2017).*
Babaeizadeh, Mohammad, et al. "Reinforcement learning through asynchronous advantage actor-critic on a gpu." arXiv preprint arXiv:1611.06256 (2016). https://arxiv.org/abs/1611.06256 (Year: 2016).*
Weaver, Lex, and Nigel Tao. "The optimal reward baseline for gradient-based reinforcement learning." arXiv preprint arXiv: 1301.2315 (2013). https://arxiv.org/abs/1301.2315 (Year: 2013).*
Lillicrap, Timothy et al., Continuous Control with Deep Reinforcement Learning, ICLR 2016, 14 pages, Retrieved from: arxiv.org.
Minh, Volodymyr et al., Asynchronous Methods for Deep Reinforcement Learning, 33rd International Conference on Machine Learning, 2016, 10 Pages, Retrieved from: jmlr.org.
Ross, Stephane et al., A Reduction Imitation Learning and Structured Prediction to No-Regret Online Learning, 14th AISTATS, 2011, pp. 627-635, Retrieved from: jmlr.org.
Schulman, John et al., High-Dimensional Continuous Control Using Generalized Advantages Estimation, ICLR, Oct. 20, 2018, 14 Pages, Retrieved from: arxiv.org.
Sharma, Sahil et al., Learning to Factor Policies and Action-Value Functions: Factored Action Space Representations for Deep Reinforcement Learning, CORR, May 20, 2017, 18 Pages, Retrieved from: arxiv.org.
Subramanian, Kaushik et al., Exploration from Demonstration for Interactive Reinforcement Learning, AAMAS, May 9, 2019, 10 Pages, Retrieved from: gatech.edu.
Van Hasselt, Hado et al., Deep Reinforcement Learning with Double Q-Learning, AAAI Conference, 2016, pp. 2094-2100, Retrieved from: aaai.org.
Wang, Han et al., Exploring Multi-Action Relationship in Reinforcement Learning, LNCS, vol. 9810, Aug. 10, 2016, 13 Pages, Retrieved from: researchgate.net.
Zhang, Xiaoqin et al., Pretraining Deep Actor-Critic Reinforcement Learning Algorithms with Expert Demonstrations, CORR, Feb. 9, 2018, 7 Pages, Retrieved from: arxiv.org.
Bellemare, Marc et al., A Distributional Perspective on Reinforcement Learning, 34th International Conference on Machine Learning, Jul. 21, 2017, 19 Pages, Retrieved from: https://arxiv.org/pdf/1707.06887.pdf.
Hester, Todd et al., Learning from Demonstrations for Real World Reinforcement Learning, arXiv:1704.03732v1 [cs.AI], Apr. 12, 2017, 11 Pages, Retrieved from: https://pdfs.semanticscholar.org/.
Kim, Beomjoon et al., Approximate Policy Iteration with Demonstration Data, Advances in Neural Information Processing Systems (NIPS), 2013, 5 pages, Retrieved from: https://pdfs.semanticscholar.org/.
Hester, Todd et al., Deep Q-Learning from Demonstrations, 32nd AAAI Conference on Artificial Intelligence, 2018, pp. 3223-3230, Retrieved from: https://arxiv.org/pdf/1704.03732.pdf.
Wang, Ziyu et al., Dueling Network Architectures for Deep Reinforcement Learning, arXiv:1511.06581v3 [cs.LG], Apr. 5, 2016, 15 Pages, Retrieved from: https://arxiv.org/pdf/1511.06581.pdf.
Babaeizadeh, Mohammad et al., GA3C: GPU-based A3C for Deep Reinforcement Learning, 30th Conference on Neural Information Processing Systems (NIPS), 2016, 7 Pages, Retrieved from: researchgate.net.
Le, Hoang et al., Hierarchical Imitation and Reinforcement Learning, 35th International Conference on Machine Learning, Jun. 9, 2018, 14 Pages, Retrieved from: https://arxiv.org/pdf/1803.00590.pdf.
Mnih, Volodymyr et al., Human-level Control Through Deep Reinforcement Learning, Nature, Feb. 26, 2015, vol. 518, pp. 529-533, Retrieved from: http://files.davidqiu.com//research/nature14236.pdf.
Andersen, Garrett et al., Learning High-level Representations from Demonstrations, arXiv:1802.06604v3 [cs.AI], Feb. 28, 2018, 7 Pages, Retrieved from: https://arxiv.org/pdf/1802.06604.pdf.
Silver, David et al., Mastering the Game of Go with Deep Neural Networks and Tree Search, Nature, Jan. 28, 2016, vol. 529, pp. 484-489, Retrieved from: http://web.iitd.ac.in/~sumeet/Silver16.pdf.
Fortunato, Meire et al., Noisy Networks for Exploration, ICLR Conference, 2018, 21 Pages, Retrieved from: https://arxiv.org/pdf/1706.10295.pdf.
Ng, Andrew et al., Policy Invariance Under Reward Transformations: Theory and Application to Reward Shaping, ICML 1999, pp. 278-287, Retrieved from: http://luthuli.cs.uiuc.edu/~daf/courses/games/AIpapers/ng99policy.pdf.
Gao, Yang et al., Reinforcement Learning from Imperfect Demonstrations, 35th International Conference on Machine Learning, Feb. 14, 2018, 13 Pages, Retrieved from: https://arxiv.org/pdf/1802.05313.pdf.
Haarnoja, Tuomas et al., Soft Actor-Critic: Off-Policy Maximum Entropy Deep Reinforcement Learning with a Stochastic Actor, arXiv:1801.01290v2 [cs.LG], Aug. 8, 2018, 14 Pages, Retrieved from https://arxiv.org/pdf/1801.01290.pdf.
Schaal, Stefan, Learning From Demonstration, Advances in Neural Information Processing Systems 9 (NIPS), 1996, pp. 1040-1046, Retrieved from: https://papers.nips.cc/paper/1224-learning-from-demonstration.pdf.
Nair, Ashvin et al., Overcoming Exploration in Reinforcement Learning with Demonstrations, ICRA Conference, May 21, 2018, pp. 6292-6299; Retrieved from: https://arxiv.org/pdf/1709.10089 pdf.
Schaul, Tom et al., Prioritized Experience Replay, ICLRm Feb. 25, 2019; 21 Pages, Retrieved from: https://arxiv.org/pdf/1511.05952.pdf.
Harmer, Jack et al., Imitation Learning with Concurrent Actions in 3D Games, arXiv:1803.05402v5 [cs.AI], Sep. 6, 2018, 8 Pages, Retrieved from: https://arxiv.org/pdf/1803.05402.pdf.

* cited by examiner

Neural Network Architecture 600

REINFORCEMENT LEARNING FOR CONCURRENT ACTIONS

FIELD OF THE INVENTION

The present invention relates to reinforcement learning, and in particular to systems and methods for training reinforcement learning agents to perform concurrent actions.

BACKGROUND

Reinforcement learning agents take actions in response to the state of a virtual environment with the aim of maximising some reward. To train reinforcement learning agents, the agents perform actions within the virtual environment and, in response, receive rewards from the virtual environment. A policy of the reinforcement learning agent, which defines the actions taken by the reinforcement learning agent in response to a given state of the virtual environment, is then updated according to the received reward. Reference is directed to Sutton, Richard S., and Andrew G. Barto. "Reinforcement learning: An introduction", MIT press, 1998.

SUMMARY

In accordance with a first aspect, this specification describes a computer-implemented method for training a reinforcement learning agent to interact with an environment. The method includes instantiating a policy function approximator. The policy function approximator is configured to calculate a plurality of estimated action probabilities in dependence on a given state of the environment. Each of the plurality of estimated action probabilities corresponds to a respective one of a plurality of discrete actions performable by the reinforcement learning agent within the environment. The method further comprises calculating, using the policy function approximator, an initial plurality of estimated action probabilities in dependence on a first state of the environment; and, when the environment is in the first state, concurrently performing two or more of the plurality of discrete actions within the environment in dependence on the initial plurality of estimated action probabilities. In response to concurrently performing the two or more of the plurality of discrete actions, a reward value is received; and, in response to the reward value being greater than a baseline reward value, the policy function approximator is updated. The policy function approximator is updated such that the updated policy function approximator is configured to calculate an updated plurality of estimated action probabilities in dependence on the first state of the environment. The values of the updated plurality of estimated action probabilities which correspond to the concurrently performed two or more of the plurality of discrete actions are greater than the respective values of the initial plurality of estimated action probabilities. The values of the updated plurality of estimated action probabilities which do not correspond to the concurrently performed two or more of the plurality of discrete actions are less than the respective values of the initial plurality of estimated action probabilities.

In accordance with a second aspect, the specification describes a system comprising: a virtual environment, a trained reinforcement learning agent, a display module and a user-controlled agent. The virtual environment is configured to output a first visual representation of a state of the environment comprising first pixel data and output a second visual representation of the state of the environment comprising second pixel data. The trained reinforcement learning agent is configured to receive the first visual representation of the environment. The trained reinforcement learning agent comprises a trained policy function approximator. The trained policy function approximator is trained to calculate a plurality of estimated action probabilities in dependence on the first visual representation of the state of the environment. Each of the plurality of estimated action probabilities corresponds to a respective one of a plurality of discrete actions performable by the trained reinforcement learning agent within the environment. The trained reinforcement learning agent further comprises an action performance module. The action performance module is configured to concurrently perform two or more actions within the environment in dependence on the plurality of estimated action probabilities. The display module is configured to cause the second visual representation of the state of the environment to be displayed to the user. The user-controlled agent is controlled by the user and is configured to concurrently perform two or more actions within the environment in dependence on two or more inputs provided by the user.

In accordance with a third aspect, this specification describes a computer-implemented method for operating a reinforcement learning agent within an environment. The method includes loading a trained policy function approximator. The trained policy function approximator is trained to calculate a plurality of estimated action probabilities in dependence on a visual representation of a state of the environment comprising pixel data, wherein each of the plurality of estimated action probabilities corresponds to a respective one of a plurality of discrete actions performable by the reinforcement learning agent within the environment. The method further comprises calculating, using the trained policy function approximator, a plurality of estimated action probabilities in dependence on a visual representation of a first state of the environment. The method also includes concurrently performing two or more of the plurality of discrete actions with the environment in dependence on the plurality of estimated action probabilities when the environment is in the first state.

BRIEF DESCRIPTION OF THE DRAWINGS

Certain embodiments of the present invention will now be described, by way of example, with reference to the following figures.

DETAILED DESCRIPTION

Example implementations provide system(s) and methods for the training and use of reinforcement learning agents in an environment, e.g. virtual environments provided by video game applications. For example, systems and methods described herein may reduce the computational resources required to train a reinforcement learning agent having acceptable performance and/or enable improved performance of trained reinforcement learning agents. These systems and methods are particular adapted for performing multiple concurrent actions in a discrete action setting.

In accordance with various example implementations, a reinforcement learning agent capable of performing multiple discrete actions per time step is provided. The reinforcement learning agent is trained using a described technique where the reinforcement learning agent determines a set of initial action probabilities based on an environment state, concurrently performs multiple discrete actions in the environment, receives a reward, and updates a policy function approximator based on the received reward. If the received reward is greater than a baseline reward, the policy function approximator is updated such that, for that environment state, the action probabilities for the concurrently performed actions are increased and the action probabilities for other actions are decreased. If the received reward is less than a baseline reward, the policy function approximator is updated such that, for that environment state, the action probabilities for the concurrently performed actions are decreased, and the action probabilities for other actions are increased.

The described systems and methods are particularly advantageous in the context of video games. Video games include virtual environments which are responsive to a large number of concurrently performable discrete actions. By enabling reinforcement learning agents to be effectively trained to concurrently perform multiple discrete actions at a time, the described systems and methods can greatly increase the challenge provided by 'enemy' reinforcement learning agents to players of the video game. These systems and methods may also enable agents to be trained whose behaviour more closely resembles that of a human opponent.

Interactive System

Figure 1:
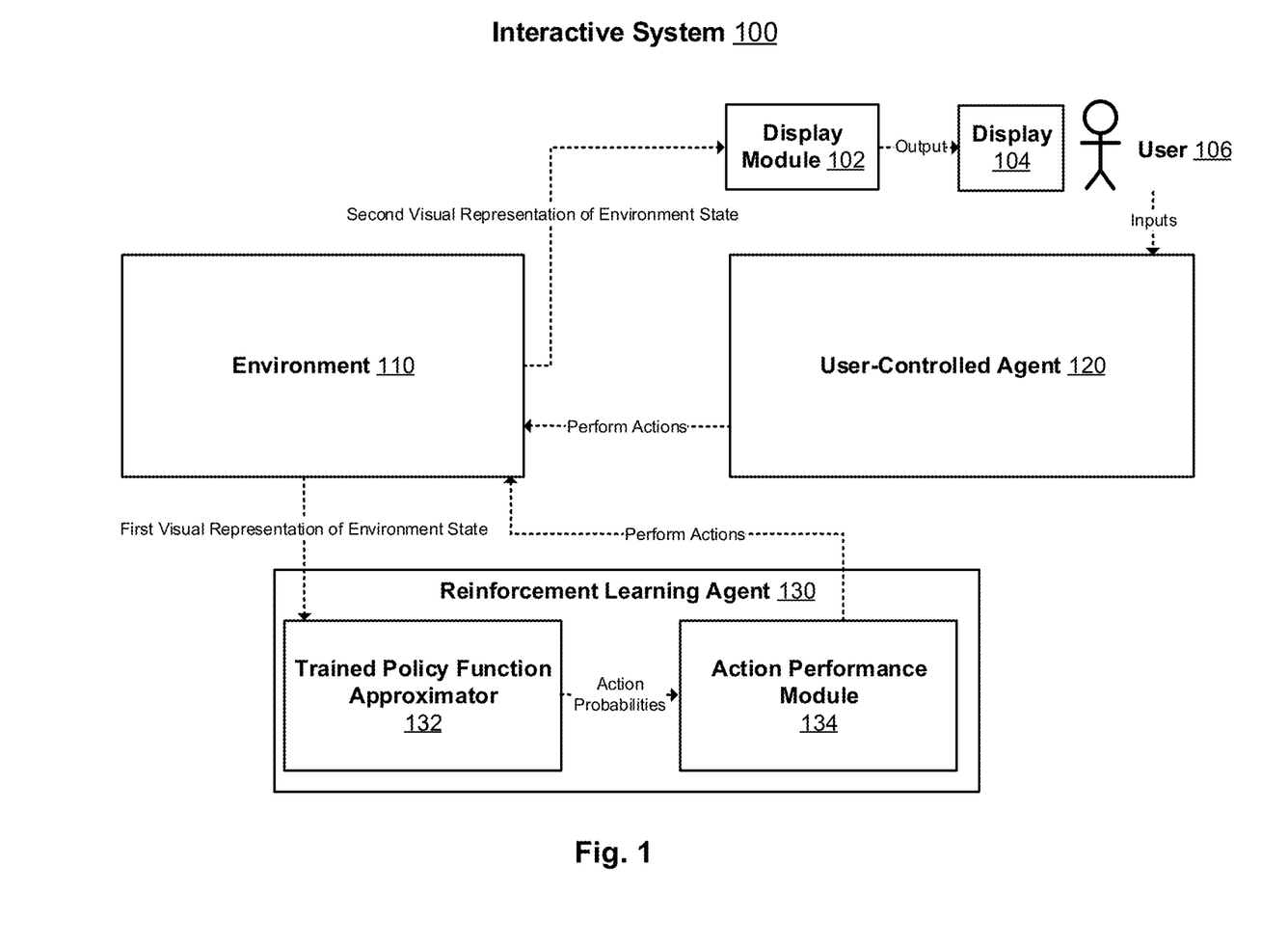
FIG. 1 is a schematic block diagram illustrating an example of a system where a reinforcement learning agent may interact with a virtual environment.

FIG. 1 shows an example of an interactive system 100 in which a reinforcement learning agent 130 and a user 106 may interact with a virtual environment 110.

The interactive system 100 implements the virtual environment 110, a user-controlled agent 120, and a reinforcement learning agent 130. The interactive system 100 may be implemented on a single computing device or may be implemented across a plurality of computing devices. For example, the user-controlled agent 120 may be implemented on a client computing device, such as a personal computer or games console, and the virtual environment 110 and reinforcement learning agent 130 may be implemented on one or more servers. Such a client computing device and one or more servers may be connected via a network, e.g. the internet or a local area network.

The virtual environment 110 may be a complex environment having a large action space, i.e. a large number of performable actions. Furthermore, several of these performable actions may be performed simultaneously. At a given time step, the environment has a state. The state of the environment may have a number of parameters, e.g. the objects and agents present in the environment, the current appearance of these objects and agents, and the position of these objects and agents.

A first visual representation of the state of the environment comprising pixel data is provided to the reinforcement learning agent 130 at each of a number of time steps. The first visual representation of the environment may only represent part of the environment. For example, the reinforcement learning agent 120 may be provided with a first visual representation of the environment corresponding to the 'field of view' of the agent. The first visual representation of the environment may also contain visual information corresponding to audio information of the virtual environment, e.g. a low-fidelity 'radar view' indicating the location of nearby agents where a human could deduce such information by hearing sounds made in the environment by these nearby agents. The 'radar view' may also contain a marker indicating the location of a goal, e.g. a region-of-interest, as, where the environment is a game, this information is typically provided to a player.

The state of the environment 110 is, therefore, partially observable by the reinforcement learning agent 130. The state of the environment 110 being partially observable to the reinforcement learning agent 130 may lead to more 'human-like' behaviour by the reinforcement learning agent 130 compared to systems where the agent is able to fully observe the environment since partial observation may be more akin to the experience of the environment provided to a human operator at any given moment.

A second visual representation of the state of the environment is provided to a display module 102, at each of a number of time steps. These time steps may be the same or differ from those at which the first visual representation is provided to the reinforcement learning agent 130. The second visual representation of the state of the environment is suited for display to a human user interacting with the environment. In some embodiments, the second visual representation may be a higher resolution, and so comprise pixel data representative of more pixels, than the first visual representation. In contrast in some embodiments the first visual representation may contain the minimum number of pixels for the reinforcement learning agent to obtain a selected performance level.

The display module 102 receives the second visual representation of the environment state and causes the second visual representation to be outputted to the display 104. Prior to outputting the second visual representation, the display module 102 may, if necessary, transform the second visual representation in to a format suitable for display. The display module 102 may also apply image enhancement techniques such as anti-aliasing and anisotropic filtering to aesthetically improve the visual representation.

The display 104 is connected to or integrated with the computing device on which the display module 102 is implemented. Examples of suitable displays include televisions, computer monitors, digital projectors and integrated LCD screens. The display 104 displays the second visual representation of the environment to a user 106.

The user 106 observes the second visual representation of the environment on the display 104 and in response provides a plurality of inputs to the user-controlled agent. The plurality of inputs include a plurality of concurrent discrete inputs, e.g. in the form of multiple concurrent presses on multiple buttons of a gamepad and/or a plurality of concurrent presses on multiple keys of a keyboard.

The inputs from the user are received by a user-controlled agent 120. The user-controlled agent 120 is a computer-implemented agent which interacts with the virtual environment in dependence on inputs received from the user 106. Based on the received inputs, the user-controlled agent 120 performs a plurality of corresponding actions in the environment 110, performing actions concurrently in response to any concurrent discrete inputs. The user-controlled agent may be a component of the same computer program as the environment itself or it may perform the actions in the environment by making an application programming interface (API) call or a remote service call to the environment.

Figure 6:
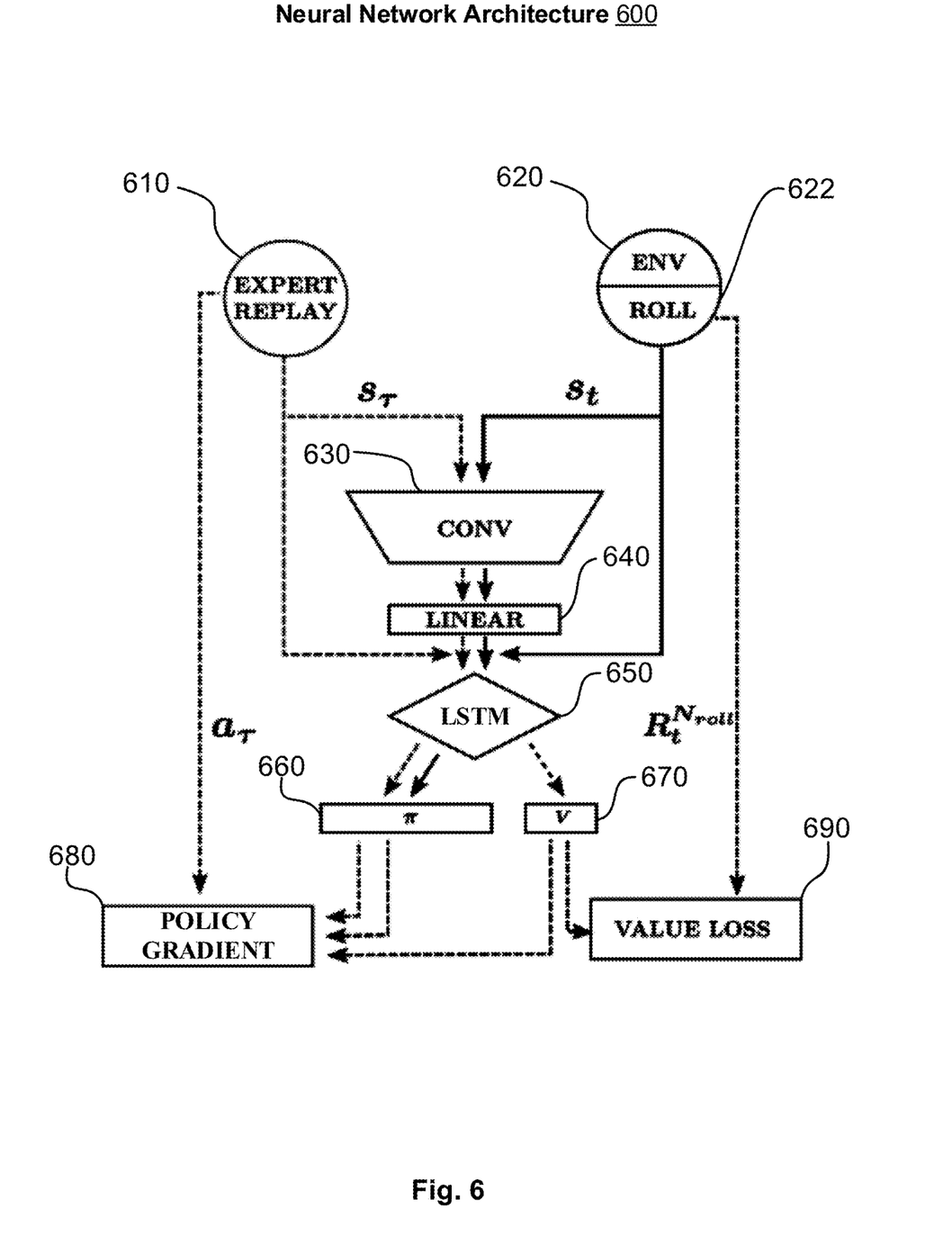
FIG. 6 illustrates an example neural network architecture configured for use in a reinforcement learning agent.

The reinforcement learning agent 130 includes a trained policy function approximator 132 and an action performance module 134. The trained policy function approximator 132 receives the first visual representation of the state of the environment and derives a plurality of estimated action probabilities, each corresponding to an action performable within the virtual environment 110. Each estimated action probability provides an indication of how likely the corresponding action is to be rewarding i.e. to lead to the greatest cumulative reward over the long term. The trained policy function approximator may be trained according to the training method 400 shown in FIG. 4. In some implementations the trained policy function approximator may comprise a neural network. An exemplary neural network architecture for the trained policy function approximator is illustrated in FIG. 6.

The estimated action probabilities are provided to the action performance module 134 by the trained policy function approximator 132. The action performance module 134 uses the estimated action probabilities to perform a number of actions concurrently in the environment. For example, if a given estimated action probability is 0.5 then there is a probability of 0.5 that the action is performed. Such probabilistic behaviour may be implemented using a pseudo-random number generator. In some embodiments, the action performance module may be deterministic. For example, the actions corresponding to estimated action probabilities greater than a threshold, e.g. 0.5, may be performed. In response to performing the actions, the agent receives a reward indicating the effect of their actions on the environment.

Virtual Environment

Figure 2:
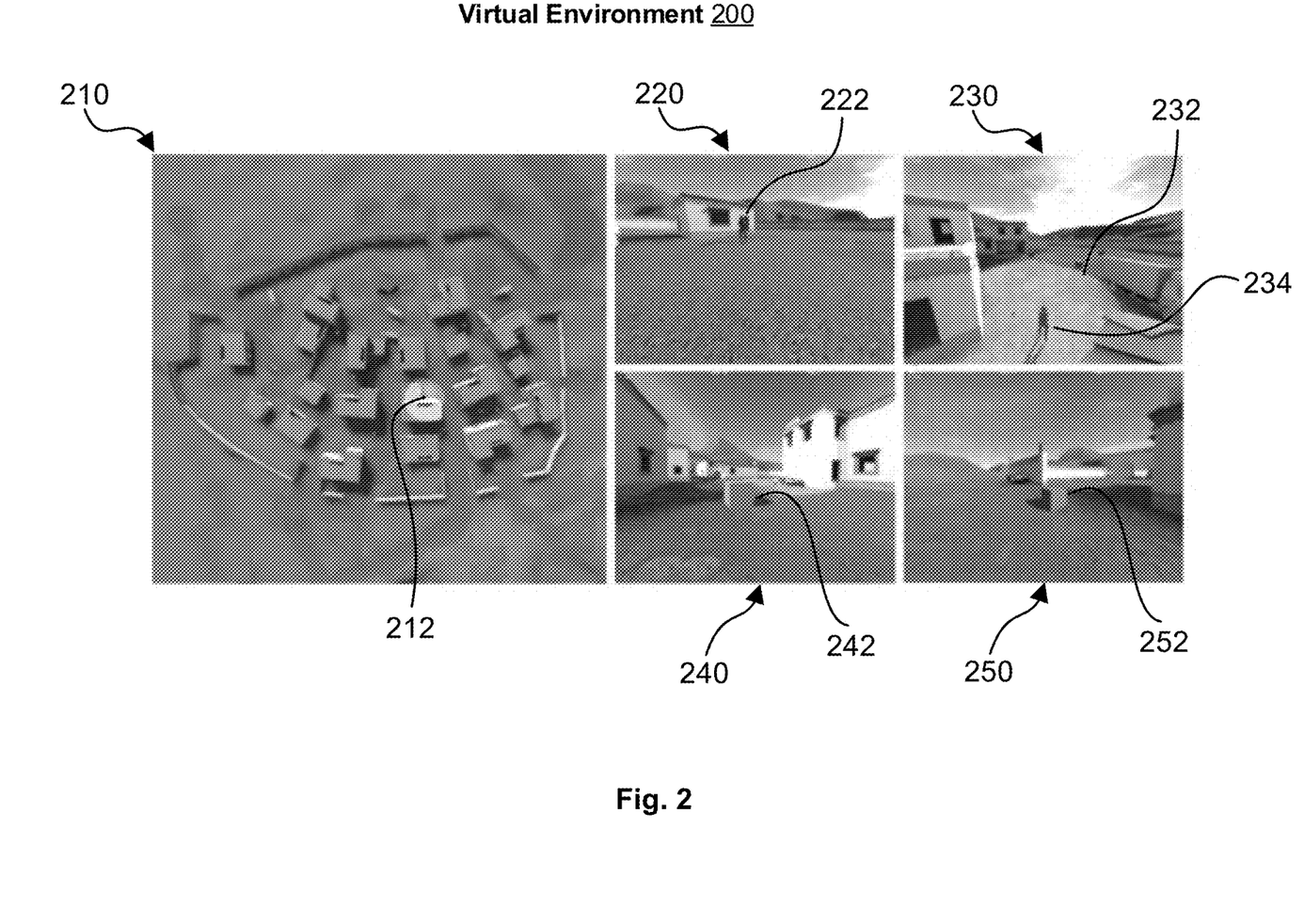
FIG. 2 illustrates an example virtual environment with which a reinforcement learning agent may interact.

FIG. 2 illustrates an example virtual environment 200 (e.g. environment 110) with which a reinforcement learning agent (e.g. reinforcement learning agent 130) may interact.

The example virtual environment 200 is a three-dimensional first person shooter video game. The virtual environment 200 contains health and ammo boxes which can be collected by the agents (both user-controlled and learning agents), enemies and a region-of interest. The locations of the health and ammo boxes and the region-of-interest on the map change at regular intervals. Changing the locations of the health and ammo boxes both ensures that the game is enjoyable for the user and, as the same environment may also be used for training reinforcement learning agents, reinforcement learning agents trained using the environment exhibit are 'intelligent' rather than being adapted to a static environment.

During the game, enemies spawn in waves and navigate towards an agent, and attack once they are within range of the agent. Rewards are received by the reinforcement learning agent for eliminating the enemies, collecting the health and ammo, and for finding and occupying the region of-interest on the map.

In this environment, the agent is able to perform a variety of actions: translation in any of three-dimensions, head tilting, rotation with multiple torque settings, and firing. An agent that is able to perform multiple concurrent actions (e.g. reinforcement learning agent 130) may perform any combination of these actions simultaneously.

A top-down view 210 of the environment 200 is illustrated. The top-down view 210 demonstrates that the environment 200 contains a number of buildings which may be used as cover by the agent and enemies. The region-of-interest 212, which the agent receives rewards for finding and occupying, is highlighted in the top-down view.

Several local views (220, 230, 240, 250) of the environment 200 are also illustrated. View 220 is a local view of the environment containing an enemy 222. View 230 is a local view of the region-of-interest 232 containing an enemy 234. Desirable behaviour by an agent in this context would be to eliminate the enemy 234 then occupy the region-of-interest 232. View 240 is a local view containing health 242. View 250 is a local view containing ammo.

Visual Representation of Environment State

Figure 3:
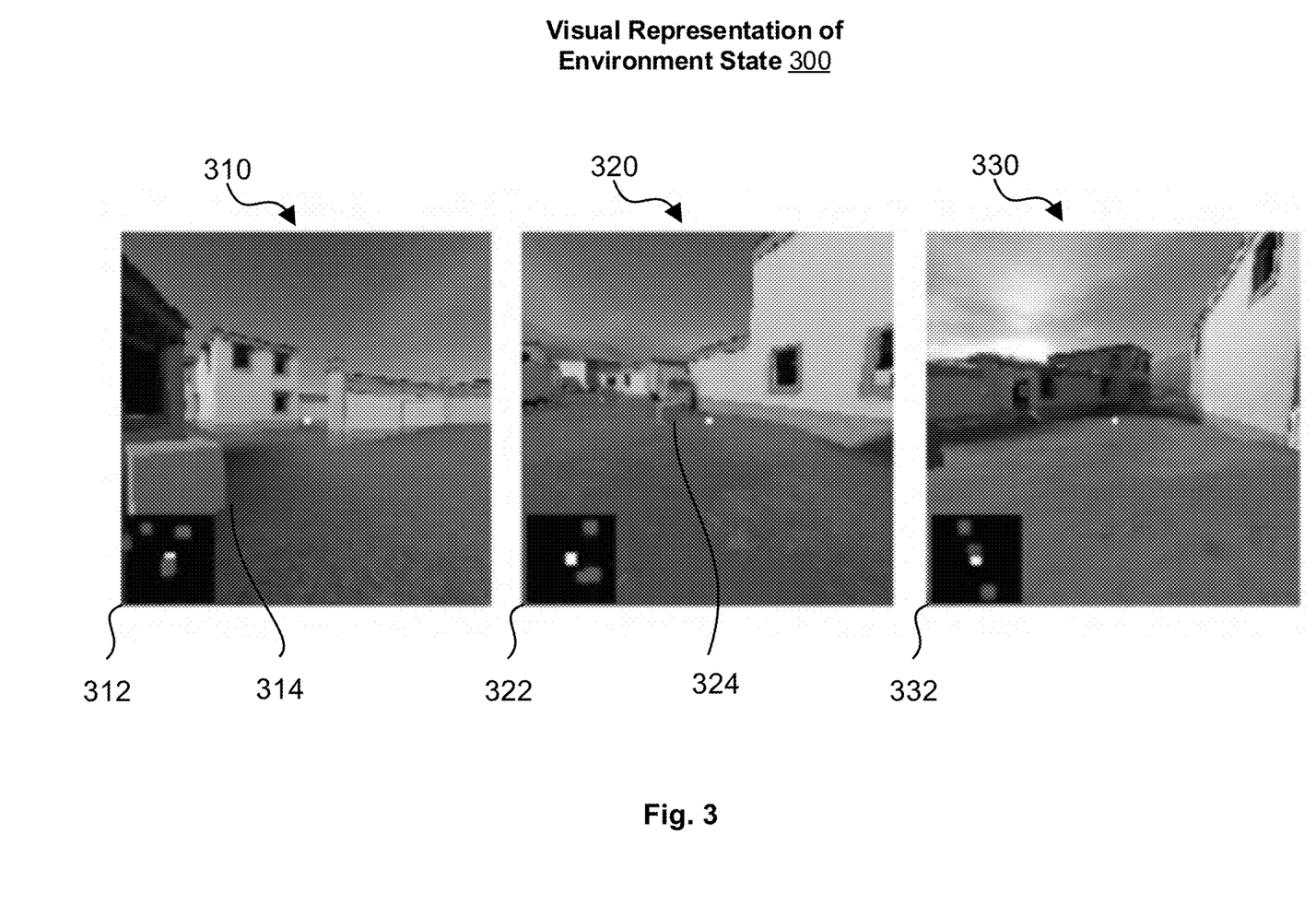
FIG. 3 illustrates a visual representation of a state of a virtual environment which may be provided to a reinforcement learning agent.

FIG. 3 illustrates several visual representations (310, 320, 330) of the state of an example virtual environment 200 that may be provided to a reinforcement learning agent (e.g. reinforcement learning agent 130).

As can be seen, the visual representations (310, 320, 330) provided to the reinforcement learning agent are of a low resolution, 128×128 in the illustration. In addition to a low-resolution local view of the environment, each of the visual representations (310, 320, 330) also includes a small radar view (312, 322, 332). As described with respect to FIG. 1, the radar view indicates the location of nearby agents where a human could deduce such information by hearing sounds made in the environment by these nearby agents. It may also contain an indication of the location of the region-of-interest as this information would typically be provided to a human player.

The visual representation 310 of a first environment instance shows a health box 314. The visual representation 320 of a second environment instance shows an ammo box. The visual representation 330 of a third environment instance is highlighted compared to the others to indicate the agent that it is within the region-of-interest. Buildings are shown in each of these instances.

Each of the radar views (312, 322, 332) show a number of enemies and a region of interest-marker. As can be seen, the positions of the enemies and the region-of-interest relative to the agent are different in each of these instances.

Reinforcement Learning Agent Training Method

Figure 4:
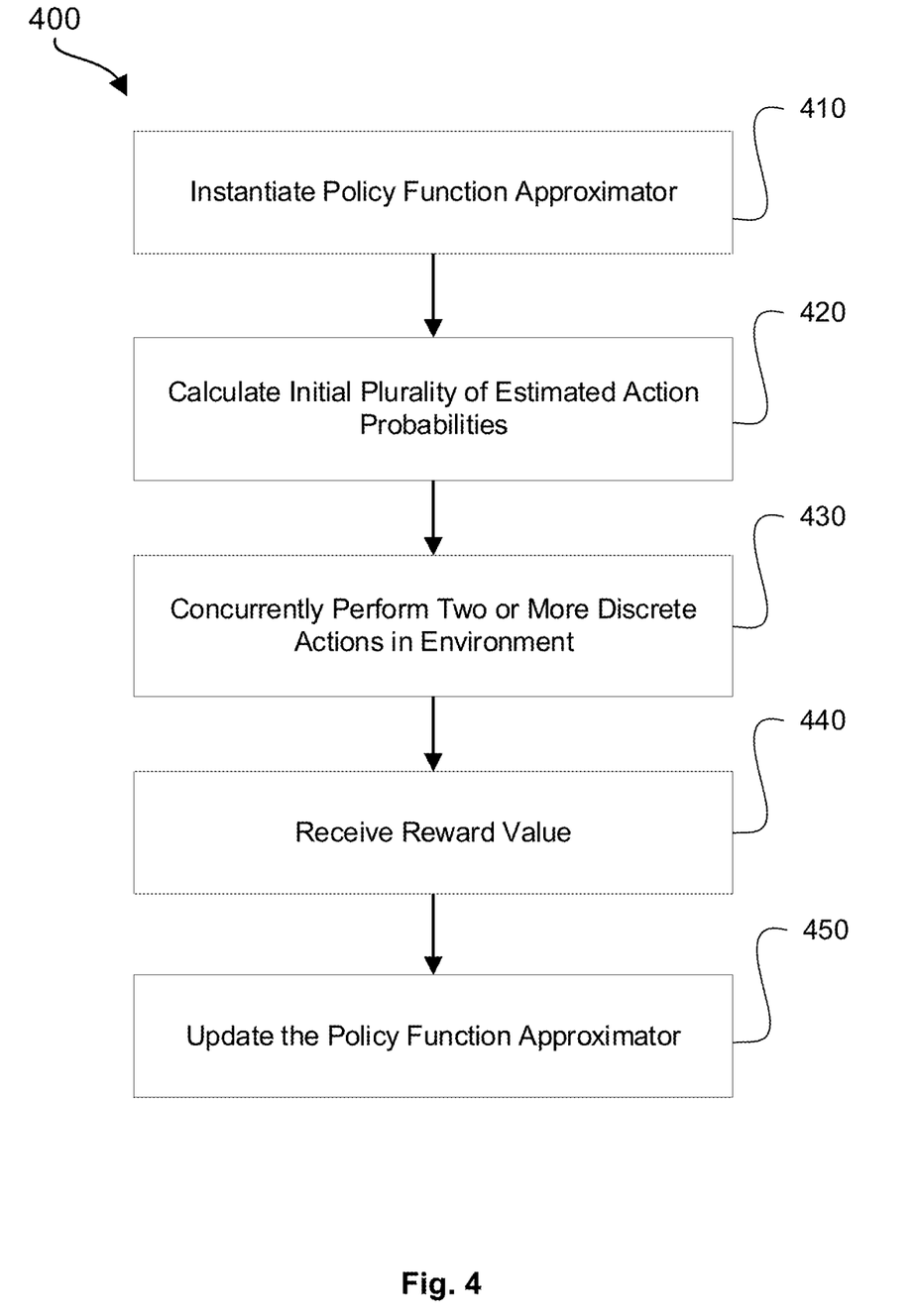
FIG. 4 is a flow diagram of an example method for training a reinforcement learning agent to interact with a virtual environment.

FIG. 4 is a flow diagram illustrating an example method of training a reinforcement learning agent to interact with an environment. This is intended as an example and other methods may be used instead. The method is performed by executing computer-readable instructions using one or more processors of one or more computing devices.

In step 410, a policy function approximator is instantiated. The policy function approximator may comprise a neural network, or may comprise a suitable function approximator, e.g. a support vector machine or a Gaussian process model. Where the policy function approximator comprises a neural network, instantiating the policy function approximator comprises instantiating the neural network. Instantiating the neural network may comprise initialising the layers, nodes and connections defined in a neural network architecture, e.g. neural network architecture 600 of FIG. 6, and initializing the weights of the connections with suitable values. The output layer of the neural network architecture may be configured to indicate multiple discrete actions per time step. In such an output layer, a sigmoid may be applied per action in the output layer to output a probability for each individual action. The output layer may comprise a plurality of nodes which each independently calculates a probability for a respective action.

In step 420, an initial plurality of estimated action probabilities is calculated using the policy function approximator based on a first state of an environment, where each estimated action probability corresponds to an action performable within the environment. Each estimated action probability provides an indication of how likely the corresponding action is to be rewarding i.e. to lead to the greatest cumulative reward over the long term.

To estimate the initial plurality of estimated action probabilities, a representation of the first state of the environment may be provided to the policy function approximator. The representation may be a visual representation of the state of the environment comprising a number of pixels. Such a visual representation may also contain visual information corresponding to audio information of the virtual environment, e.g. a low-fidelity 'radar view' indicating the location of nearby agents where a human could deduce such information by hearing sounds made in the environment by these nearby agents. The 'radar view' may also contain a marker indicating the location of a goal, e.g. a region-of-interest, as, where the environment is a game, this information is typically provided to a player. Where the policy function approximator is a neural network, the representation of the first state of the environment may be provided to the policy function approximator as a vector.

In step 430, multiple discrete actions are concurrently performed in the environment in dependence on the estimated action probabilities. Each action may be performed with a probability based on its corresponding estimated action probability. For example, if a given estimated action probability is 0.5 then there is a probability of 0.5 that the action is performed. Such probabilistic behaviour may be implemented using a pseudo-random number generator. Only a single action or no actions may be performed in some instances. For example, given two possible actions each having a probability of 0.5 of being performed, there is a probability of 0.25 that no actions are performed, a probability of 0.5 that one is performed, and a probability of 0.25 that both actions are performed concurrently.

In step 440, a reward value is received. The reward value is a value derived based on the effect of the reinforcement learning agent's interaction with the environment, i.e. the response of the environment to the actions it has performed. For example, in a video game environment, the reward value may be derived based on performed actions resulting in enemies being eliminated, health and/or resources (e.g. ammo) being received by the agent, and/or the agent being located within a region of interest. While the term reward value is used, the reward value may also be negative if an action results in a 'negative' effect. For example, in a video game environment, examples of a negative effect are the wastage of resources (e.g. ammo) and the loss of health.

Steps 420 to 440 may be repeated several times resulting in several sets of concurrent actions being performed, and several corresponding reward values being received.

In step 450, the policy function approximator is updated in response to the received reward value(s) being different to a baseline reward value. The policy function approximator is updated so that it calculates an updated plurality of estimated action probabilities in dependence on the first state of the environment. If the received reward value is greater than a baseline reward value, the probability of the updated plurality of estimated action probabilities which correspond to the concurrently performed actions are increased, while those corresponding to actions which were not performed are decreased. If, instead, the received reward value(s) is less than a baseline reward value, the plurality of estimated action probabilities corresponding to the performed actions is decreased, while those correspond to actions which were not performed are increased.

In embodiments where the policy function approximator comprises a neural network, the policy function approximator may be updated by performing a training iteration. The training iteration comprises calculating a policy gradient update, and using the policy gradient update to perform gradient descent across the weights of the network. The policy gradient update, $\hat{g}$, may be calculated according to the following formula:

$$\hat{g} = -\frac{1}{M}\sum_{i=1}^{M}\left(\sum_{t \in B_i} \nabla_\theta H(a_t, \phi_\theta(s_t))A_t\right)$$

where B is a set of M independent rollouts of live experiences $B_1, \ldots, B_M$, and $\phi_\theta(s)$ is a model of the networks policy output for a given state s as Bernoulli random variables, $A_t$ is the advantage for the respective state, $s_t$, and action, $a_t$. H is given by the following:

$$H = \sum_i a_i \log(\phi_\theta(s_t))A + \sum_i (1-a_i)\log(1-\phi_\theta(s_t))A$$

The advantage, A, may be calculated as:

$$A = R_t^{N_{roll}} - V(s_t)$$

where $V(s_t)$ is an estimated state value, the state value being the discounted future reward, $N_{roll}$ is a number of concurrent action sets to be performed known as the rollout length, $R_t^{N_{roll}}$ is an improved estimated state value after performing the $N_{roll}$ concurrent action sets where $R_t^{N_{roll}}$ may be calculated as:

$$R_t^{N_{roll}} = (\gamma r_1 + \gamma^2 r_2 + \ldots \gamma^{N_{roll}} r_{N_{roll}}) + V(s_{t+N_{roll}})$$

where $\gamma$ is the discount factor, $r_i$ is the reward received at time step i, and $V(s_{t+N_{roll}})$ is the estimated state value of the state obtained after performing the $N_{roll}$ concurrent sets of actions. The estimated state values in both cases may be obtained using a state value approximator.

State Value Approximator Training Method

Figure 5:
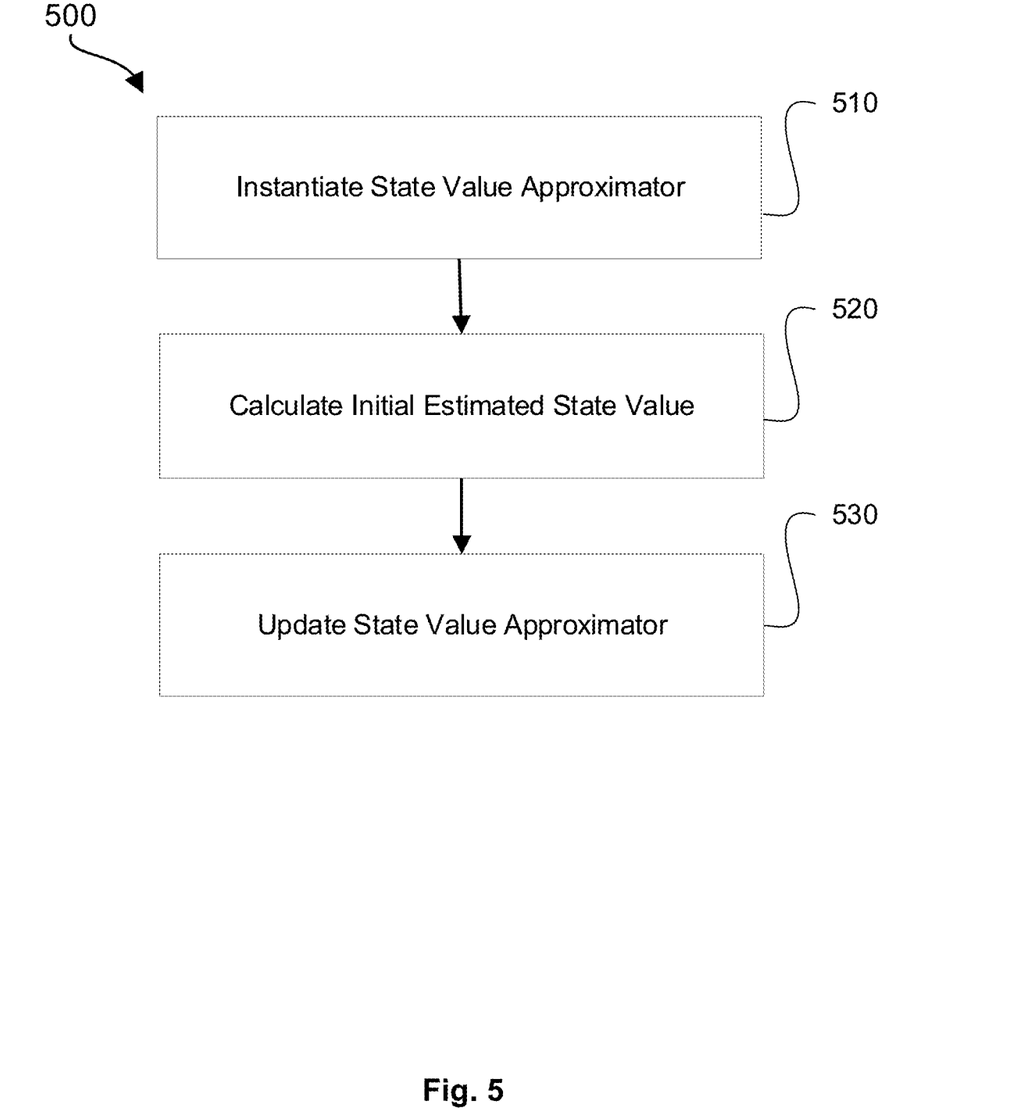
FIG. 5 is a flow diagram of an example method for training a state value approximator to estimate a state value in dependence on a state of a virtual environment.

FIG. 5 is a flow diagram illustrating an example method of training a state value approximator. This is intended as an example and other methods may be used instead. The method is performed by executing computer-readable instructions using one or more processors of one or more computing devices.

At step 510, a state value approximator is instantiated. The state value approximator may comprise a neural network, or may comprise a suitable function approximator, e.g. a support vector machine or a Gaussian process model. Where the policy function approximator comprises a neural network, instantiating the policy function approximator comprises instantiating the neural network. Instantiating the neural network may comprise initialising the layers, nodes and connections defined in a neural network architecture, e.g. components of the neural network architecture 600 of FIG. 6, and initializing the weights of the connections with suitable values. As illustrated in FIG. 6, several of the layers, nodes and weights may be shared with that of a neural network included in the policy function approximator. In some embodiments, the same neural network is used for the state value approximator and the policy function approximator with distinct output layers for the state value output and the policy output, as the policy output comprises a plurality of estimated action probabilities while the state value is a single numerical value.

At step 520, an initial estimated state values is calculated using the state value approximator based on a first state of an environment, where initial estimate state value approximator estimates the future discounted reward from the first state onwards.

To estimate the estimated state value, a representation of the first state of the environment may be provided to the state value approximator. The representation may be a visual representation of the state of the environment comprising a number of pixels. The visual representation is typically the same as that provided to the policy function approximator. Where the state value approximator is a neural network, the representation of the first state of the environment may be provided to the state value approximator as a vector.

Prior to step 530, the steps 430 and 440, described with respect to FIG. 4, are performed one or more times, so one or more sets of concurrent actions are performed and one or more corresponding reward values are received.

In step 530, the state value approximator is updated in response to the received reward value being greater than a baseline reward value. The state value approximator is updated so that it calculates an updated state value in dependence on the first state of the environment. Where the received reward value is greater than a baseline reward value, the estimated state value for the first state of the environment is increased. If, instead, the received reward value is less than a baseline reward value, the estimated state value for the first state of the environment is decreased.

In embodiments where state value approximator comprises a neural network, the state value may be updated by performing a training iteration. The training iteration may comprise calculating a loss function value in dependence on the reward and the initial estimated state value, deriving a gradient using the loss function and performing gradient descent across the weights of the network via backpropagation. An example of a suitable loss function is the square of the approximation of the advantage, as previously defined. Using the square of the advantage as the loss function causes the network to be updated such that, over a number of training iterations, its estimates of states' values become more accurate.

Neural Network Architecture

FIG. 6 illustrates an example neural network architecture 600 configured for use in a reinforcement learning agent. The example neural network architecture 600 provides both a policy function approximator and a state value approximator. In addition to being trained using reinforcement learning, the illustrated architecture is concurrently trained using expert data, e.g. data indicating the actions taken by humans within given states of the environment. Training using expert data is known as imitation learning. The architecture 600 is, therefore, trained simultaneously using both reinforcement learning and imitation learning. In this diagram, solid lines represent the flow of data during influence while dashed lines represent the flow of data during training.

In the neural network architecture, the expert replay inputter 610 provides expert replay data. The expert replay data comprises expert state-action pairs which each include: a state data item based on a state of the environment; and an expert action data item based on one or more actions taken by an expert when the environment was in the respective state. The state data item is inputted to the convolutional layers 630 of the network and the expert action data item is passed to the policy gradient calculator 680.

The environment inputter 620 provides a representation of the current state of an environment to the network. This representation of the state of the environment is passed to the convolutional layers 630 of the neural network.

The rollout collector 622 collects one or more rewards received from the environment after actions are performed and provides them to the value loss calculator 690.

The convolutional layers 630 perform a number of convolutions on the representation of the state of the environment inputted to them. The representation of the state of the environment may have been received from either the expert replay inputter 610 or the environment inputter 620. In an exemplary embodiment, the convolutional layers comprise one convolutional layer using a 5×5 kernel, and three convolutional layers using a 3×3 kernel. The output of the convolutional layers is then fed in to a linear layer 640.

The linear layer 640 performs a linear transformation on the input received from the final convolutional layer. At this linear layer 640, other data may also be concatenated. For example, normalised numbers representing the agent's health and ammo may be appended. The output of the linear layer is then fed in to a number of long short-term memory (LSTM) layers 650.

The LSTM layers 650 are recurrent layers enabling the network to remember information over a number of inferences. Hence the network can remember useful information from preceding states of the environment. Therefore, a reinforcement learning agent comprising the network can exhibit complex behaviours as its output is based on a number of states of the environment in addition to the current state.

The policy output layer 660 receives the output of the LSTM layers 650 and applies a suitable transformation to generate a plurality of estimated action probabilities. For example, each node of the policy output layer may receive a weighted combination of the components of the output of the LSTM layer and apply a sigmoid function to derive an estimated action probability.

The value output layer 670 receives the output of the LSTM layers 650 and applies a suitable transformation to calculate an estimated state value. For example, the value output layer 670 may be a linear layer that applies a linear transformation, e.g. matrix multiplication, to the output of the LSTM layers 650.

During training, the policy gradient calculator 680 calculates a policy gradient. This calculated gradient is used to perform a neural network training iteration as described with respect to step 450 of FIG. 4. The calculation of the policy gradient in this instance uses the reward, state and estimated action probabilities, similarly to the gradient described with respect to step 450 of FIG. 5, but also uses the expert replay data. The policy gradient calculator 680 may calculate the policy gradient according to the following formula:

$$\hat{g} = -\nabla_\theta \frac{1}{M} \sum_{i=1}^{M} \left( \sum_{t \in B_i} H(a_t, \phi_\theta(s_t)) A_t + \lambda_E \sum_{e \in B_i^E} H(a_e, \phi_\theta(s_e)) \right)$$

where $\lambda_E$ is the weighting vector applied to the imitation learning component, $a_E$ is the expert action vector. B is a set of M independent rollouts of live experiences $B_1, \ldots, B_M$, and $B_E$ is a set of M independent batches of expert data $B_1^E, \ldots, B_M^E$, and $\phi_\theta(s)$ is a model of the networks policy output for a given state s as Bernoulli random variables, $A_t$ is the advantage for the respective state, $s_t$, and action, $a_t$.

Combining reinforcement learning with imitation learning, in this way, enables the reinforcement learning agent to perform better than it would were it to be trained using one of these methods, particularly in high-dimensional, reward sparse environments. In these environments, reinforcement learning alone can be highly inefficient as the agent has to try a vast number of combinations of actions before it receives any reward. Extensive training is, therefore, required before it performs reasonably. Given the high-dimensional space, there is also a possibility that the agent will never learn a good strategy. Imitation learning enables the agent to use actions made by an expert in the same state to guide learning. However, using imitation learning alone is also problematic as it is bounded by the expert's performance, i.e. an agent trained using imitation learning cannot perform better than the expert. Furthermore, unless a very large quantity of expert data can be obtained and/or the task is fully observed, training on expert data is likely to lead to overfitting strategies to the particular states observed in the expert scenario. However in various example implementations described herein, reinforcement learning and imitation learning may be combined by updating a policy approximator in dependence on a received reward value and one or more expert state-action pairs, as described above. By combining reinforcement learning and imitation learning in this way and using the policy gradient function described, a reinforcement learning agent may be efficiently trained without overfitting to expert data and without being bounded by experts' performance. To further ensure that the performance of the reinforcement learning agent is not bounded by experts' performance, the weighting of the imitation learning component, $\lambda_E$, in the above loss function may be decayed during training.

During training, the value loss calculator 690 calculates a value loss, i.e. a loss function to update the value layer and the preceding layers. The value loss is calculated using the reward, state and estimated action probabilities, as using the expert data to calculate the value loss reduced the performance and stability of the agent. The value loss may, therefore, be calculated as the square of the advantage as described previously.

Example Behaviours

Figure 7:
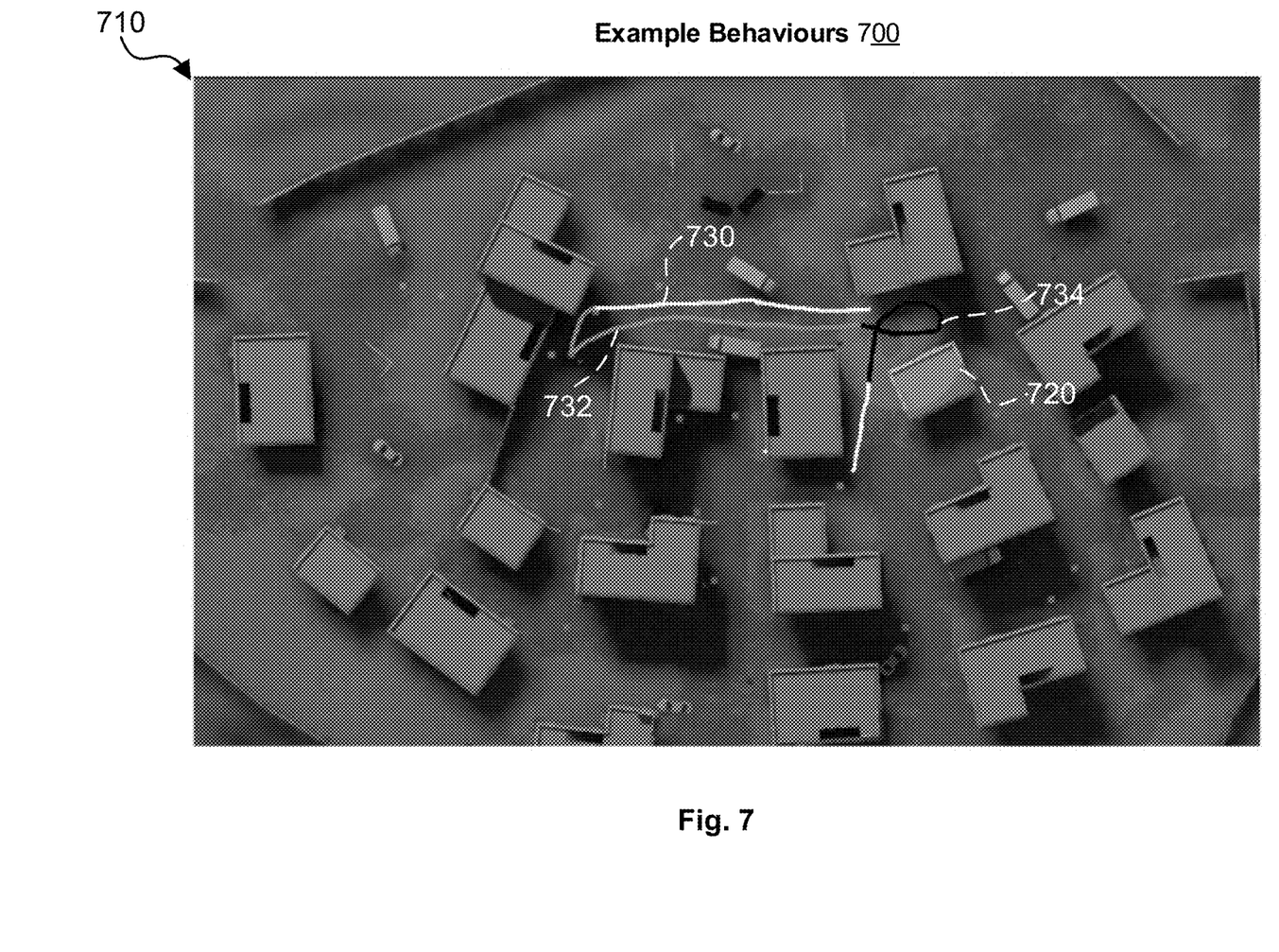
FIG. 7 illustrates the behaviour of an exemplary trained reinforcement learning agent within a virtual environment.

FIG. 7 is a diagram 700 illustrating behaviours of a reinforcement learning agent, trained according to embodiments of the systems and methods described herein, in the example environment 200. An agent comprising the neural network architecture 600 and being trained according to the methods 400 and 500 may demonstrate these behaviours.

A top-down view 710 of the example environment 200. In this instance of the example environment, the region-of-interest is located at region 720. The agent exhibits complex behaviours when operating in this environment. Several lines (730, 732, 734) indicate the movement of the agent. Along movement path 73o the agent seeks the region-of-interest while picking up boxes, subsequently, along movement path 732, the agent seeks ammo then, along movement path 734, the agent patrols the region-of-interest before resuming picking up boxes.

This illustration shows only a subset of the complex behaviours the agent may exhibit. Furthermore, many of these behaviours are modal and occur due to the agent being in a given state, e.g. running low on health and/or ammo. Example of complex behaviours exhibited by the agent include: searching for the waypoint, searching for ammo/health, patrolling the waypoint, attacking enemies, fleeing enemies due to low health/ammo, rapidly turning around to face enemies immediately after finding ammo and human like navigation around buildings.

Trained Reinforcement Learning Agent Action Performance Method

Figure 8:
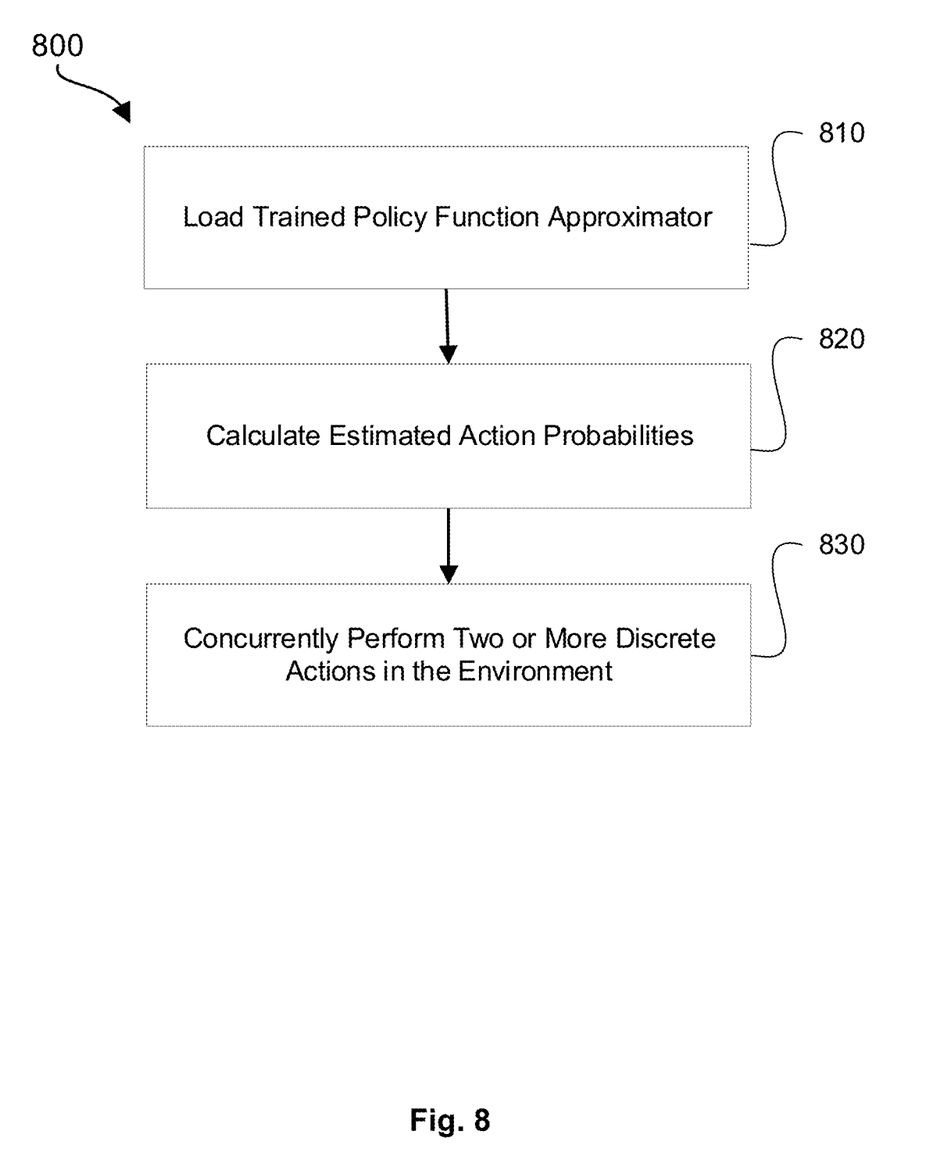
FIG. 8 is a flow diagram of an example method for performing two or more concurrent actions in a virtual environment with a trained reinforcement learning agent.

FIG. 8 is a flow diagram illustrating an example method 800 for a trained reinforcement learning agent to interact with an environment. This is intended as an example and other methods may be used instead. The method is performed by executing computer-readable instructions using one or more processors of one or more computing devices.

At step 810, a trained policy function approximator is loaded. The trained policy function approximator may comprise a neural network so loading the trained policy function approximator may comprise instantiating a trained neural network. Instantiating the trained neural network may comprise initialising the layers, nodes and connections defined in a neural network architecture, e.g. neural network architecture 600 of FIG. 6, and loading trained weights for the connections.

At step 820, the loaded trained policy function approximator receives a visual representation of the state of the environment including pixel data and derives a plurality of estimated action probabilities, each corresponding to an action performable within the environment. Each estimated action probability provides an indication of how likely the corresponding action is to be rewarding i.e. to lead to the greatest cumulative reward over the long term. The estimated action probabilities may each be bounded in the range zero to one and treated as probabilities.

At step 830, a number of actions are performed concurrently in the environment. In some embodiments, each action is performed with a probability based on its corresponding estimated action probability. For example, if a given estimated action probability is 0.5 then there is a probability of 0.5 that the action is performed. Such probabilistic behaviour may be implemented using a pseudo-random number generator. In some embodiments, action performance may be deterministic. For example, the actions corresponding to estimated action probabilities greater than a threshold, e.g. 0.5, may be performed. In response to performing the actions, the agent receives a reward indicating the effect of their actions on the environment.

It should be noted that, in some instances, only a single action or no actions may be performed. If the action performance is probabilistic, given two possible actions each having a probability of 0.5 of being performed, there is a probability of 0.25 that no actions are performed, a probability of 0.5 that one is performed, and a probability of 0.25 that both actions are performed concurrently. If the action performance is deterministic and none of the estimated action probabilities are greater than the threshold then no actions may be performed. Similarly, if only one of the estimated action probabilities is greater than the threshold that single action may be performed.

In the above description, numerous details are set forth. It will be apparent, however, to one of ordinary skill in the art having the benefit of this disclosure that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulation of physical quantities. Usually, though not necessarily, these quantities take the form of electrical or magnetic signals capable of being stored, transferred, combined, compared and otherwise manipulated. It has been proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "classifying," reclassifying," "determining," "adding," "analyzing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purpose, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMS and magnetic-optical disks, read-only memories (ROMs), random access memories (RAMs), EPROMs, magnetic or optical cards, flash memory, or any type of media suitable for storing electronics instructions.

The words "example" or "exemplary" are used herein to mean serving as an example, instance, or illustration. Any aspect or design described herein as "example" or "exemplary" is not necessarily to be construed as preferred or advantageous over other aspects of designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" in intended to mean any of the natural inclusive permutations. That is, if X includes A; X includes B; or X includes both A and B, then "X includes A and B" is satisfied under any of the foregoing instances. In addition, the articles "a" and "an" as used in this specification and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein presented herein are inherently related to any particular computer or other apparatus. Various general purpose systems may be used with programs in accordance with the teachings herein, or it may prove convenient to construct a more specialized apparatus to perform required method steps. The required structure for a variety of these systems will appear from the description. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or method are not described in detail or are presented in simple block diagram format in order to avoid unnecessarily obscuring the present disclosure. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

The invention claimed is:

1. A computer-implemented method for training a reinforcement learning agent to interact with an environment comprising:

instantiating a policy function approximator, wherein the policy function approximator is configured to, for each discrete action out of a plurality of discrete actions concurrently performable by the reinforcement learning agent within the environment, independently calculate an estimated action probability of performing the discrete action, in dependence on a given state of the environment;

for each discrete action of the plurality of discrete actions, calculating, using the policy function approximator, an initial estimated action probability of performing the discrete action, in dependence on a first state of the environment;

when the environment is in the first state,
concurrently performing two or more of the plurality of discrete actions within the environment that have estimated action probabilities greater than a threshold, or
concurrently performing two or more of the plurality of discrete actions, each discrete action performed with a probability of a corresponding estimated action probability;

in response to concurrently performing the two or more of the plurality of discrete actions, receiving a reward value; and in response to the received reward value being greater than a baseline reward value, updating the policy function approximator, such that the updated policy function approximator is configured to calculate updated estimated action probabilities in dependence on the first state of the environment, wherein:

the values of the updated estimated action probabilities which correspond to the concurrently performed two or more of the plurality of discrete actions are greater than the respective values of the initial estimated action probabilities; and the values of the updated estimated action probabilities which do not correspond to the concurrently performed two or more of the plurality of discrete actions are less than the respective values of the initial estimated action probabilities.

2. The method of claim 1, wherein the policy function approximator comprises a policy neural network.

3. The method of claim 2, wherein an output layer of the policy neural network comprises a plurality of nodes which each independently calculates a probability for a respective one of the discrete actions.

4. The method of claim 2, wherein updating the policy function approximator comprises calculating a policy gradient, wherein calculating the policy gradient comprises calculating a cross-entropy in dependence on the action probabilities of the initial estimated action probabilities which correspond to the concurrently performed two or more of the plurality of discrete actions.

5. The method of claim 2, wherein updating the policy function approximator comprises calculating a policy gradient, wherein calculating the policy gradient comprises calculating a cross-entropy in dependence on the action probabilities of the initial estimated action probabilities which do not correspond to the concurrently performed two or more of the plurality of discrete actions.

6. The method of claim 1, further comprising:
instantiating a state value approximator, wherein the value approximator is configured to calculate an estimated state value in dependence on a given state of the environment;
calculating, using the state value approximator, an initial estimated state value for the first state of the environment in dependence on the first state of the environment; and
in response to the received reward value being greater than a baseline reward value, updating the state value approximator such that the updated state value approximator is configured to calculate an updated estimated state value in dependence on the first state of the environment, wherein the updated estimated state value is greater than the initial estimated state value.

7. The method of claim 6, wherein the state value approximator comprises a value neural network.

8. The method of claim 6, wherein the policy function approximator is updated in dependence on the initial estimated state value and the received reward value.

9. The method of claim 1, wherein the policy function approximator is updated in dependence on the received reward value and one or more expert state-action pairs, wherein each expert state-action pair comprises:
a state data item based on a state of the environment; and
an expert action data item based on one or more actions taken by an expert when the environment was in the respective state.

10. A system comprising:
a virtual environment, wherein the virtual environment is configured to output a first visual representation of a state of an environment comprising first pixel data and output a second visual representation of the state of the environment comprising second pixel data;
a trained reinforcement learning agent configured to receive the first visual representation of the environment, wherein the trained reinforcement learning agent comprises:
a trained policy function approximator, wherein the trained policy function approximator is trained to, for each discrete action out of a plurality of discrete actions, independently calculate an estimated action probability in dependence on the first visual representation of the state of the environment, wherein the estimated action probability is a probability of performing, by the trained reinforcement learning agent, one discrete action of the plurality of discrete actions within the environment; and
an action performance module, wherein the action performance module is configured to: concurrently perform two or more actions within the environment that have estimated action probabilities greater than a threshold, or concurrently perform two or more of the plurality of discrete actions, each discrete action performed with a probability of a corresponding estimated action probability; and
a display module, wherein the display module is configured to cause the second visual representation of the state of the environment to be displayed to a user;
a user-controlled agent controlled by the user, wherein the user-controlled agent is configured to concurrently perform two or more actions within the environment in dependence on two or more inputs provided by the user.

11. The system of claim 10, wherein the trained policy function approximator comprises a trained policy neural network.

12. The system of claim 11, wherein an output layer of the trained policy neural network is a sigmoid per action output layer.

13. The system of claim 10, further comprising:
a trained state value approximator, wherein the trained state value approximator is configured to calculate am estimated state value in dependence on a given state of the environment.

14. The system of claim 11, wherein the trained policy neural network comprises one or more long short-term memory layers.

15. The system of claim 10, wherein the virtual environment is a video game environment.

16. A computer-implemented method for operating a reinforcement learning agent within an environment comprising:
loading a trained policy function approximator, wherein the trained policy function approximator is trained to, for each discrete action out of a plurality of discrete actions, independently calculate an estimated action probability in dependence on a visual representation of a state of the environment comprising pixel data, wherein the estimated action probability corresponds to a probability of performing, by the reinforcement learning agent, one discrete action of the plurality of discrete actions within the environment;
calculating, using the trained policy function approximator, a plurality of estimated action probabilities in dependence on a visual representation of a first state of the environment; and
when the environment is in the first state,
concurrently performing two or more of the plurality of discrete actions within the environment that have estimated action probabilities greater than a threshold, or concurrently performing two or more of the plurality of discrete actions, each discrete action performed with a probability of a corresponding estimated action probability.

17. The method of claim 16, wherein the trained policy function approximator comprises a trained policy neural network.

18. The method of claim 17, wherein an output layer of the trained policy neural network is a sigmoid per action output layer.

19. The method of claim 17, wherein the trained policy neural network comprises one or more long short-term memory layers.

20. The method of claim 16, wherein the environment is a video game environment.

* * * * *